United States Patent Office 2,938,794
Patented May 31, 1960

2,938,794

PRESERVATION OF MICROBIAL CELLS

Lloyd G. Herman, North Riverside, Ill., assignor to Wilson & Co., Inc., a corporation of Delaware No Drawing. Filed July 3, 1953, Ser. No. 366,077

8 Claims. (Cl. 99—2)

This invention relates to the preservation of viable spores and cells of various species of microbes and fungi, either in a pure culture or in a naturally or otherwise occurring symbiotic mixture. In particular, it relates to a method of harvesting, drying and storing fungal spores and bacterial spores and/or cells, especially bacterial flora derived from rumen juice, and to the products.

This application is a continuation-in-part of my co-pending application Serial No. 298,627, filed July 12, 1952, now abandoned.

In accordance with the method of the present invention, viable fungal spores and bacterial spores and/or cells are transferred from non-liquid, but moist, host media by means of a non-toxic crystalline carrying agent, preferably sucrose (sugar) crystals, to which the spores and cells adhere, and the freshly coated crystals are then quickly mixed, more or less immediately, with a dehydrating or desiccating agent in particulate form so that the spore- and/or cell-coated crystals retain their single crystalline characteristics. The object of the quick mixing with the dehydrating agent is to effect dehydration of the spore- and/or cell-coated crystals before there is caking. With sugar, in particular, dehydration is difficult if there is caking. The desiccating agent may be permitted to remain with the dehydrated coated crystals or it may be separated therefrom, as desired.

The spore- and/or cell-coated crystals with or without the dehydrating agent, are, when in the desired form of the present invention, dry-to-the-touch and in a free flowing state, not unlike the free flowing state of ordinary household granulated sugar or salt crystals.

In the practice of the process of my invention the spore and/or cells are transferred as centrifuged sediment from a liquid medium or from any non-liquid, but moist, solid medium, say a nutrient agar contained in Petri plates, and the quantities of sugar crystals and desiccant particles are chosen to provide the apparently dry, free flowing mixture. There is no critical amount of sugar or other non-toxic crystals and of desiccant which must be used. In general, the quantity of sugar used should be at least sufficient to remove all fungal and bacterial growth from the host medium without becoming syrupy and the quantity of desiccant used should be at least sufficient to insure substantially complete and rapid dehydration of the spore- and/or cell-coated sugar crystals, thereby insuring the retention of the single crystalline characteristics of the sugar crystals. Larger quantities of the sugar crystals and of the desiccant may, of course, be used, but this is wasteful of material.

Fully matured spores and/or cells of microbial organisms treated in accordance with the present invention can be held in a viable but dry and suspended state of animation for many months, in many cases for three to four years and even more. I have preserved in excess of 75 types and species of spores and cells in accordance with my invention and the spore and cells attached to the coated crystals have been tested from time to time and even after forty-four (44) months' storage at room temperature, they still show excellent viability without any loss in characteristic growth.

The advantages of the invention are many. It is a simple, inexpensive and effective method for making available at all times an unlimited number of viable spores and/or cells; in carrying it out no special or expensive equipment is necessary; and it minimizes and even eliminates the chance contamination of the laboratory and pure cultures of other microorganisms. The importance of this last advantage is apparent when it is considered that in the past the contamination of laboratory equipment and growing cultures of other microorganisms by air-borne spores was commonplace. As is known, many fungal organisms produce quickly millions upon millions of very small spores which are easily carried by air currents. In accordance with my invention the spore and/or cells are bound to (imprisoned on) the crystal surfaces and the possibility of their becoming air-borne is very substantially reduced, if not eliminated.

A further advantage of my invention is that it provides a simple and inexpensive process wherein treated cultures can be transferred to suitable media, either liquid or solid, in whole or in part, without sacrificing the container or contaminating the remaining material with undesirable spores and/or cells. Heretofore, mold spores, for example, could not be easily transferred to liquid or solid nutrient media without endangering the living culture by incident contamination except through the use of an expensive lyophilizing or freeze-drying apparatus. This apparatus placed limitations upon the prior art method for preserving bacteria, the chief of which are low daily production rates and the high cost per unit of the finished material. Neither of these disadvantages is attendant to the method of my invention.

My invention is applicable to the treatment of all spores and/or cells of microbial organisms of the class consisting of Schizomycetes and Fungi, including the fully matured spores and/or cells of such organisms. Examples of fungal spores and/or cells which may be treated in accordance with my invention are the molds *Penicillium notatum* and *Aspergillus glaucus*, the yeast *Saccharomyces cerevisae* and the actinomycetes *Streptomcyes griseus*. Examples of bacterial spores and/or cells which may be treated in accordance with my invention are *Bacillus subtilis* (aerobic) and *Clostridium welchii* (anaerobic), the Gram negative bacteria *Escherichiae coli* and the Gram positive bacteria *Lactobacillus leichmannii* and *Micrococcus aureus*. Similarly, there may be treated naturally occurring or synthetically made symbiotic cultures of the above fungal and microbial organisms, including symbiotic cultures of aerobic and/or anaerobic bacteria found in sewage treating plants, bacteria and/or molds used in cheese plants, bacteria and yeasts used in dairy plants, spores and/or cells of microorganisms used in the production of antibiotic substances and/or vitamins, the bacterial flora from rumen juice, for example from a healthy cow, sheep or other ruminant, etc.

As noted above, the preferred crystals are sucrose (sugar) crystals. These should be used in a sterile form to prevent contamination of the microbial organisms. I prefer to sterilize the sugar crystals in approximately 10 gram amounts in clean 20 x 150 mm. screwcapped test tubes, by holding them in a drying oven at a temperature of not less than about 100° C. or more than about 110° C. for a time period of not less than about 12 hours or more than 24 hours. Under these conditions the crystals are sterile and free from carmelization. Other sterilization conditions may, of course, be used, and it is to be understood that the conditions of sterilization form no part of the present invention and that my invention is not to be construed as limited thereto. The important factor is that the sugar crystals should be sterile since otherwise contamination is a possibility. Other crystals which may be used as a carrier for the microbial organisms in my invention are sodium chloride crystals, crystals of salts which are non-toxic to the organisms such as magnesium sulfate and sodium nitrate, agar-agar granules, gelatin crystals, egg albumen crystals and crystals of sugars other than sucrose such as lactose, fructose, dextrose, as well as other similar water-soluble, non-toxic crystalline material.

The size of the sugar or other carrier crystal or granule may vary widely, as desired. It is preferred that the size of these carrier crystals or granules be smaller than the particle size of the dehydrating agent, although it is within the purview of my invention that the size of the former be equal to or even larger than the latter. For most purposes, a particle size of from about 50 to 200 mesh for the carrier crystals or granules and from about 5 to 50 mesh for the granules of dehydrating agent is satisfactory for the practice of my invention in accordance with its preferred aspects.

The dehydrating agent may be granules of such desiccants as calcium chloride, mixtures of calcium sulfate and sodium sulfate (one such being available on the market under the trademark "Drierite"), and the like. I prefer, however, to use silica gel crystals, preferably the "Tel-Tale" silica gel crystals sold by the Davison Chemical Corp. of Baltimore, Md. These "Tel-Tale" crystals are treated with an indicator which has a blue color when the crystals are dry and capable of dehydrating and a pink or colorless appearance when devoid or substantially devoid of dehydrating properties. Before any use in accordance with the present invention the silica gel crystals are given a heat and time sterilizing treatment similar to that given the sugar crystals. Temperature and time of treatment of the silica gel crystals is not as important as in the case of the sugar crystals. The heat treatment not only sterilizes the silica gel crystals but also drives off any previously absorbed moisture and thereby regenerates the intense blue indicator color.

In the practice of my invention the cultures to be preserved should be selected to insure cultural purity. The method of making such selection is in accordance with methods described by the Society of American Bacteriologists. The selected cultures are grown in Petri plates (dishes) containing nutrients (potato dextrose or tryptone glucose or a meat infusion base, etc.) known to support rapid and typical growth when added to an agar-agar base. These plates are held at temperatures providing for the optimum growth of the organism and thus may vary from about 20° C. to 55° C. for periods of one to twelve days. In this time the maximum growth is usually obtained.

Plates of fungal growth capable of producing asexual spores normally show a dry powdery surface covering of these spores. These are easily removed in accordance with my invention by dumping the contents (about 10 grams) of a sterile tube of sucrose (sugar) crystals onto it and shaking vigorously with the lid of the Petri plate replaced, until the sugar crystals have loosened many, if not most, of the spores and absorbed sufficient moisture from the agar medium to show a tendency to cake. The moistened spore-covered crystals are then dumped into a similar empty sterile Petri plate to which is immediately added the contents (about 10 grams) of a tube of sterile silica gel crystals. A short shaking period, say up to about one minute, effects an intimate mixture of the sugar and silica gel crystals and the mixture assumes an apparently dry form and is free flowing or pourable. The mixture may then be dumped onto a sterile piece of paper and transferred to a screw capped sterile test tube or other container, as required for future use.

If desired, the contents of several plates may be combined and sterile sugar crystals added to dilute the mass to a definite spore or cell count per given weight or volume. The crystals of silica gel may be left in the mixture to insure continued moisture control or they may be removed as by shaking through sterile screens of a size capable of separating the small sugar crystals from the larger silica gel crystals, and used as needed. If the silica gel crystals are to be left in the mixture through the time of the ultimate use of the viable spores or cells, they may have the same size as the sugar crystals and they may even be smaller.

In harvesting and preserving a moist colony growth of bacterial spores or cells or yeast spores or cells growing on a nutrient agar based medium, a sterile bent glass rod is helpful in scraping off the surface growth and insuring a good mixture of cells and sugar crystals. The amount of silica gel crystals should be increased at least two to four times that previously used, to insure complete and rapid dehydration.

Where the culture to be harvested and preserved is found growing naturally in liquids or sludges, and the organisms can be concentrated by centrifuging to remove excess moisture, the concentrated organisms and the associated sediment may be stirred into sugar crystals and the mixture then dehydrated by the addition of the necessary quantities of sterile silica gel crystals. This is the procedure used in harvesting and preserving bacterial flora present in the rumen (paunch) juice from ruminants.

The methods of harvesting, drying and preserving microbial organisms of my invention is so simple and effective that it is possible to produce the bulk equivalent contents of several thousand tubes of spores and/or microbial cells preserved by the prior art freeze-drying apparatus, in a matter of a few hours, by the mere use of such simple equipment as test tubes, Petri plates, stirring rod and a sieve, normally found in the most elementary bacteriological laboratory.

When a subculture is required, it is merely necessary to use a small inoculating loop, moistened in sterile broth, and carefully touch a few spore- and/or cell-covered sugar crystals. The moisture holds the spores and/or cells to the loop and these are merely added to the culture medium where they dissolve readily and release the spores and/or cells for immediate growth. If a larger amount is required, a sterile measuring spoon is inserted into the mouth of the bottle containing the organism-coated crystals and the desired quantity withdrawn and added to the larger quantity of medium where the organisms are released from their carrier and start to grow immediately. The spore-covered crystals make possible the ready mixing of the spores with all types of nutrient media, whereas spores removed from the surface of mold colonies generally appear to float on the surface of the medium and do not mix well.

The method of my invention has substantially equal efficacy in the preservation of all species of spores and cells of microbial organisms, including yeast spores, bacterial spores, non spore-forming cells, the bacterial flora from rumen juice, etc. And it has particular usefulness in those commercial processes where it is desired to use large amounts of viable culture to inoculate various materials such as silage, wine progenitors, enzyme growing material, milk, feed for ruminants, etc., and where storage and handling problems are difficult.

The method of my invention for the harvesting, drying and preservation of the bacterial flora from rumen juice find special usefulness for the preparation of a medicinal product for calves and for convalescent cattle and other species of the ruminant groups to restore lost rumen flora. The bacterial flora to be preserved by my invention is obtained as follows: The paunch contents of healthy steers, heifers, sheep or other ruminant, preferably as it is taken from the animal, is passed through a screen, suitably of a 15 to 40, preferably 20, mesh size screen, to remove from the rumen juice the coarser material such as corn, hay, grass and other undigested food and the larger particles of inert solid material. The material held back, on the screen is pressed and squeezed on the screen, as by hand, to remove additional amounts of rumen juice, particularly that which adhered to the surfaces of the screened material. The screened material is discarded. The rumen juice with its content of bacterial flora and unclassed solids material which passed through the screen is centrifuged, suitably in a Sharples clarifying bowl type centrifuge or other type of centrifuge, running at about 30,000 to 60,000 r.p.m. preferably 50,000 r.p.m. The resulting sediment, rumen concentrate, containing the protozoa and bacteria thrown out of the juice during centrifugation is removed from the machine. It is in a semi-moist more or less plastic state. At normal room temperatures of 70° to 80° F. it has the consistency of butter.

The rumen concentrate is now mechanically mixed with a water-soluble crystalline carrier of the types referred to, preferably sucrose crystals, the resulting bacteria-coated crystals are dehydrated by being mixed with desiccant granules, and then the desiccant granules are removed as by sieving, all as described above. The mixing of the rumen concentrate is effectively accomplished in a conventional Buffalo mixer running at full speed for about 6 to 12 minutes. The desired product of this mixing operation is a non-syrupy homogeneous brown mass, much like commercial brown suger. Varying amounts of rumen concentrate with respect to the sucrose crystals may be used to obtain this homogeneous brown mass, say 15 to 25 parts by weight of sucrose crystals to 1 part by weight of rumen concentrate. The preferred ratio is 20 parts by weight of the concentrate to 1 part by weight of the sugar.

When the mixing of the rumen concentrate and of the sugar is completed there is then added thereto in the mixer a quantity of desiccant granules sufficient to dehydrate the mass. In the case of a mixture of 1 part by weight of rumen concentrate and 20 parts by weight of sugar, 40 parts by weight of silica gel crystals are adequate to effect the desired dehydration. Mixing of the desiccant granules into the mass in the mixer is continued until dry dusty material begins to separate from the mass, at which point mixing is stopped. At this stage the product is apparently dry and free flowing. The substantially dry mixture is removed from the mixing apparatus and the desiccant granules are removed as by sieving, all as described above. The resulting dehydrated product is free flowing and easily handled or measured for addition to feeds. It consists of sugar crystals coated with the bacterial flora and other material in the rumen concentrate. The rumen concentrate including the bacterial flora is imprisoned on the surfaces of the sugar crystals by a thin film of sugar in a glassy state. This thin binding film is obtained by the wetting of the sugar crystal surfaces on contact with the moist rumen concentrate and the subsequent dehydration thereof by the desiccant granules.

The bacteria-coated sugar crystals may be fed in the dry, powder state to calves and convalescent cattle, but preferably the powder is preliminarily compacted into pellet form. If desired, this dry product, in powder or pellet form, may be mixed with skim milk, other conventional form of calf and cattle feeds, vitamins, etc. and used as a food supplement. When the product is fed to calves or cattle, solution of the product in the paunch juice is almost instantaneous and both the sugar and the organisms are rapidly distributed through the rumen contents.

In the processing of the rumen contents to obtain the rumen concentrate and in the subsequent treatment thereof with sugar and desiccant to obtain the dry, free flowing product of the present invention, it is desirable to maintain the temperature of the material undergoing treatment above about 70° to 75° F., so that the workability of the material is not impaired, and below about 105° F., so that the material is not deleteriously affected. When the desiccant granules are mixed into the mixture of the bacterial flora and sugar in the mixer there is a tendency of the mixture to rise to about 85° to 95° F., occasionally up to about 100° F. It is preferred that the temperature of the mixture in the mixing machine be controlled, as by cooling coils, so that the temperature thereof remains below about 105° F. It is imperative that the temperature of the materials at all stages of processing be maintained below incipient pasteurizing temperatures of 127°–130° F.

It is to be understood that my invention is not to be limited to the details of the illustrative embodiments described since these details may be varied widely, as will be apparent to a skilled worker in the art, without altering the invention or departing from the ambit thereof.

I claim:

1. A method of treating viable spores and/or cells of microorganisms of the class consisting of Schizomycetes and Fungi, which comprises mixing the starting material in a moist state with sucrose crystals, thereby adhering the moist starting material to the sucrose crystals, and mixing the moist coated sucrose crystals with silica gel desiccant granules.

2. A method of treating viable spores and/or cells of microorganisms of the class consisting of Schizomycetes and Fungi, which comprises mixing the starting material in a moist state with sucrose crystals, thereby adhering the moist starting material to the sucrose crystals, and mixing the moist coated sucrose crystals with silica gel desiccant granules having a larger size than the sucrose crystals.

3. A method of treating viable spores and/or cells of microorganisms of the class consisting of Schizomycetes and Fungi, which comprises mixing the starting material in a moist state with sucrose crystals, thereby adhering the moist starting material to the sucrose crystals, mixing the moist coated sucrose crystals with silica gel desiccant granules having a larger size than the sucrose crystals, to dehydrate the same, and separating the silica gel desiccant granules from the said dehydrated material.

4. A method of treating viable spores and/or cells of microorganisms of the class consisting of Schizomycetes and Fungi, which comprises mixing the starting material in a moist state with sucrose crystals, thereby adhering the moist starting material to the sucrose crystals, mixing the moist coated sucrose crystals with silica gel desiccant granules to dehydrate the same and separating the silica gel desiccant granules from the said dehydrated material.

5. A method of treating viable spores and/or cells of microorganisms of the class consisting of Schizomycetes and Fungi which are growing on a moist, non-liquid nutrient medium, which comprises mixing sucrose crystals with the said moist organisms until they adhere to the crystal surfaces, separating the moist organism-covered crystals from the nutrient medium and mixing silica gel desiccant granules with the moist, organism-covered crystals to dehydrate the same.

6. A method of treating viable spores and/or cells of microorganisms of the class consisting of Schizomycetes and Fungi which are growing on a moist, non-liquid nutrient medium, which comprises mixing sucrose crystals with the said moist organisms until they adhere to the crystal surfaces, separating the moist, organism-covered crystals from the nutrient medium, mixing silica gel desiccant granules with the moist, organism-covered crystals to dehydrate the same, and separating the silica gel desiccant granules from the dehydrated, organism-covered crystals.

7. A method of treating bacterial flora from rumen juice, which comprises separating bacterial flora in a moist state from rumen juice, mixing the separated bacterial flora while in a moist state with sucrose crystals, thereby adhering the bacterial fluora to the sucrose crystals, and mixing silica gel desiccant granules with the moist, bacterial flora-covered sucrose crystals to dehydrate the same.

8. A method of treating bacterial flora from rumen juice, which comprises separating batcerial flora in a moist state from rumen juice, mixing the separated bacterial flora while in a moist state with sucrose crystals, thereby adhering the bacterial flora to the sucrose crystals, mixing silica gel desiccant granules with the moist, bacterial flora-covered sucrose crystals to dehydrate the same, and separating the silica gel desiccant granules from the dehydrated, bacterial flora-covered sucrose crystals.

References Cited in the file of this patent
UNITED STATES PATENTS

| | | |
|---|---|---|
| 1,420,557 | Klein | June 20, 1922 |
| 1,570,418 | Wegener | Jan. 19, 1926 |
| 2,454,753 | Hager | Nov. 23, 1948 |
| 2,560,830 | Turner | July 17, 1951 |
| 2,700,611 | Jeffries | Jan. 25, 1955 |

OTHER REFERENCES

Merck Index, 5th edition, 1940, p. 502.

Davidsohn et al.: Soap Manufacture, vol. I, Interscience Pub. Inc., New York, 1953, pp. 45–47.